(12) United States Patent
Jones

(10) Patent No.: US 11,472,371 B2
(45) Date of Patent: Oct. 18, 2022

(54) LOCK DEVICE FOR MOTORIZED EQUIPMENT

(71) Applicant: Ronnie Wayne Jones, Rowland, NC (US)

(72) Inventor: Ronnie Wayne Jones, Rowland, NC (US)

(*) Notice: Subject to any disclaimer, the term of this patent is extended or adjusted under 35 U.S.C. 154(b) by 379 days.

(21) Appl. No.: 16/736,271

(22) Filed: Jan. 7, 2020

(65) Prior Publication Data
US 2021/0207405 A1    Jul. 8, 2021

(51) Int. Cl.
| | | |
|---|---|---|
| *B60R 25/022* | (2013.01) | |
| *E05B 73/00* | (2006.01) | |
| *E05B 77/44* | (2014.01) | |
| *E05B 67/38* | (2006.01) | |
| *B60R 25/02* | (2013.01) | |
| *A01D 34/82* | (2006.01) | |
| *A01D 101/00* | (2006.01) | |

(52) U.S. Cl.
CPC ........ *B60R 25/0228* (2013.01); *A01D 34/824* (2013.01); *B60R 25/02* (2013.01); *B60R 25/022* (2013.01); *B60R 25/0225* (2013.01); *E05B 67/383* (2013.01); *E05B 73/00* (2013.01); *E05B 77/44* (2013.01); *A01D 2101/00* (2013.01)

(58) Field of Classification Search
CPC ...... E05B 67/383; E05B 73/00; E05B 73/007; E05B 73/0082; E05B 73/0094; E05B 73/02; E05B 75/00; E05B 77/42; E05B 77/44; B60R 25/02; B60R 25/022; B60R 25/0221; B60R 25/0225; B60R 25/0228; B60R 25/09; A01D 34/824; A01D 2101/00
See application file for complete search history.

(56) References Cited

U.S. PATENT DOCUMENTS

| | | | | |
|---|---|---|---|---|
| 4,304,110 A | * | 12/1981 | Fain | B60R 25/0225 70/209 |
| 4,666,106 A | * | 5/1987 | Kohout | B64C 1/1423 70/94 |
| 5,005,389 A | * | 4/1991 | Wang | B60R 25/0225 70/226 |
| 5,022,697 A | * | 6/1991 | Hettwer | B60P 1/431 70/238 |
| 5,138,853 A | * | 8/1992 | Chen | B60R 25/0225 70/226 |
| 5,491,990 A | * | 2/1996 | Von-Lambert | B60R 25/0225 70/226 |
| 5,704,233 A | * | 1/1998 | Farshad | B60R 25/0221 70/238 |
| 5,899,101 A | * | 5/1999 | West | B60R 25/00 70/237 |

(Continued)

*Primary Examiner* — Christopher J Boswell
(74) *Attorney, Agent, or Firm* — Dogwood Patent and Trademark Law; Ashley D. Johnson

(57) ABSTRACT

The presently disclosed subject matter is directed to an anti-theft device for use with a motorized vehicle, such as a riding lawn mower. The device comprises a main body defined by first and second ends. Each end of the device comprises a pair of arms, each with a distal end and a proximal end. The distal end of each arm includes an aperture sized and shaped to allow a lock or other securing element to pass therethrough. For example, with riding lawn mowers, the disclosed device can be used to lock the mower handles in an "off" position, so that the mower cannot be started until the device is removed.

20 Claims, 10 Drawing Sheets

(56) References Cited

U.S. PATENT DOCUMENTS

| | | | | |
|---|---|---|---|---|
| 6,796,154 | B2 * | 9/2004 | Gebow | B60R 25/09 70/237 |
| 6,829,914 | B2 * | 12/2004 | Bullock | B60R 25/00 70/238 |
| 8,210,007 | B1 * | 7/2012 | Laracy | B60R 25/09 70/226 |
| 2003/0019682 | A1 * | 1/2003 | Schaedler | B62D 11/24 180/308 |

* cited by examiner

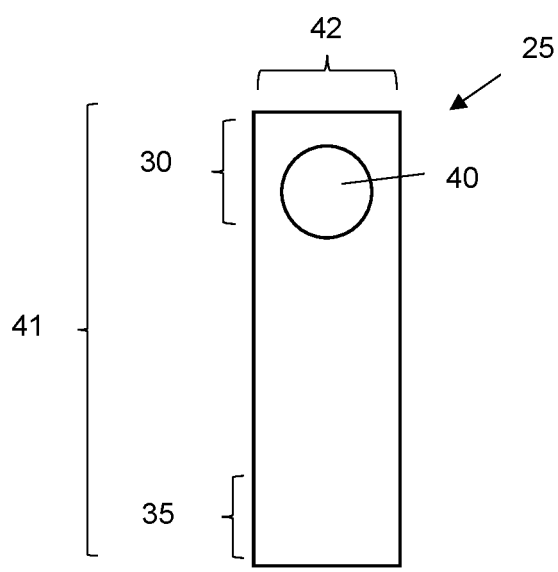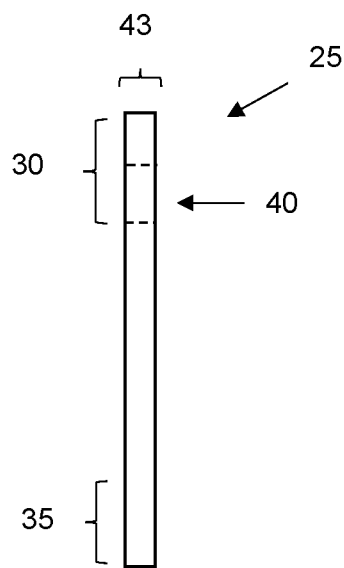
Fig. 4a
Fig. 4b
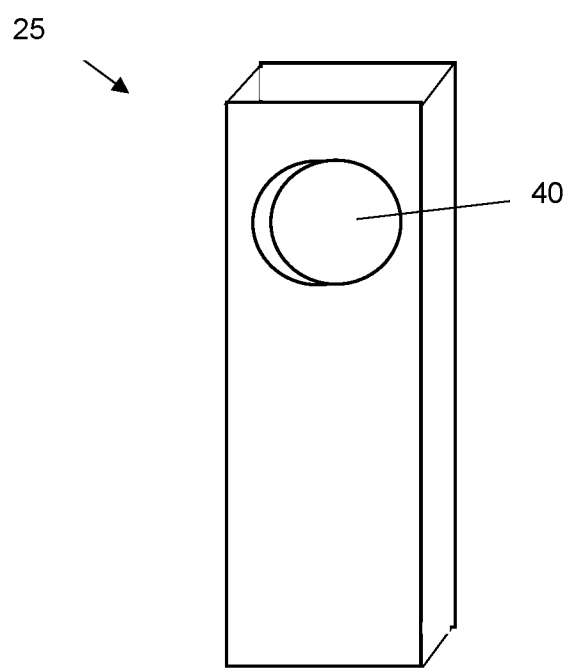
Fig. 4c

LOCK DEVICE FOR MOTORIZED EQUIPMENT

TECHNICAL FIELD

The presently disclosed subject matter relates to a lock device for use with motorized equipment, such as a riding lawn mower. The lock device effectively prevents the motorized equipment from being stolen.

BACKGROUND

During the last several years, Americans have witnessed a dramatic rise in motorized equipment for home and recreational use. For example, the use of riding lawn mowers has increased significantly as more users prefer the ease and comfort of a riding mower compared to conventional push mowers. Unfortunately, along with the rise motorized equipment usage in the agricultural, construction, and recreational industries, there has been increased incidence of theft. Such problems are extremely costly to owners, both financially and in terms of time lost. As a result, locking devices have been developed in an effort to deter theft. Particularly, locking boots have conventionally been used to lock a wheel of the vehicle. However, the locking boots are relatively large, cumbersome, expensive, and time-consuming to install and remove. It would therefore be beneficial to provide a lock device for use with a motorized vehicle that overcomes the shortcomings of the prior art.

SUMMARY

In some embodiments, the presently disclosed subject matter is directed to a device comprising a planar main body defined by a first end and a second end. The device further includes a first pair of arms positioned at the first end of the main body and a second pair of arms positioned at the second end of the main body. Each pair of arms comprises a first arm and a second arm that are separated by a predetermined distance. Each first arm is defined by an aperture that is aligned with the corresponding aperture positioned on the second arm of each pair. The arms extend from one face of the main body.

In some embodiments, at least one arm of the first pair of arms or second pair of arms is flush with the first end or second end of the main body.

In some embodiments, at least one arm of the first pair of arms or second pair of arms is positioned at a distance of 5-15% of a total length of the main body from the first end or the second end.

In some embodiments, the planar main body has an adjustable total length.

In some embodiments, the apertures on the first pair of arms align with the apertures on the second pair of arms.

In some embodiments, at least one of the first pair of arms or second pair of arms is removable from the main body.

In some embodiments, the predetermined distance between the first and second pairs of arms is adjustable.

In some embodiments, the first pair of arms is parallel to the second pair of arms.

In some embodiments, the first pair of arms, second pair of arms, or both are configured at an acute angle relative to the main body.

In some embodiments, the first pair of arms, second pair of arms, or both are configured at an obtuse angle relative to the main body.

In some embodiments, the first pair of arms, second pair of arms, or both are rotatable relative to the main body.

In some embodiments, the presently disclosed subject matter is directed to a method of securing the handles of a riding lawn mower comprising first and second handles. Particularly, the method comprises inserting the first handle of a riding lawn mower into the distance between the first pair of arms of the disclosed locking device. The method further includes inserting the second handle of the riding lawn mower into the distance between the second pair of arms of the disclosed locking device. The method comprises positioning a first securing element through the apertures of the first pair of arms and positioning a second securing element through the apertures of the second pair of arms. The method includes releasably fastening the securing elements such that they cannot be removed from the apertures of the first and second pair of arms. The handles of the riding lawn mower are secured for a desired amount of time.

In some embodiments, the presently disclosed subject matter is directed to a method of securing the handles of a riding lawn mower comprising first and second handles. Particularly, the method includes inserting the first handle of a riding lawn mower into the distance between the first pair of arms of the disclosed locking device. The method includes inserting the second handle of the riding lawn mower into the distance between the second pair of arms of the disclosed locking device. The method includes positioning a securing element through the apertures of the first pair of arms and through the apertures of the second pair of arms. The method comprises releasably fastening the securing element such that it cannot be removed from the apertures of the first and second pair of arms. The handles of the riding lawn mower are secured for a desired amount of time.

In some embodiments, the lawn mower is a zero-turn lawn mower.

In some embodiments, the securing element is selected from a zip tie, combination lock, key lock, padlock, digital lock, cable lock, or combinations thereof.

In some embodiments, the planar main body has an adjustable total length.

In some embodiments, the first pair of arms, second pair of arms, or both are configured at an acute angle relative to the main body.

In some embodiments, the first pair of arms, second pair of arms, or both are configured at an obtuse angle relative to the main body.

In some embodiments, the first pair of arms, second pair of arms, or both are rotatable relative to the main body.

BRIEF DESCRIPTION OF THE DRAWINGS

The previous summary and the following detailed descriptions are to be read in view of the drawings, which illustrate some (but not all) embodiments of the presently disclosed subject matter.

FIG. 2b is a side plan view of the device body of FIG. 2a.

FIG. 4a is a top plan view of a device arm in accordance with some embodiments of the presently disclosed subject matter.

FIG. 4b is a side plan view of the device arm of FIG. 4a.

FIG. 4c is a perspective view of a device arm in accordance with some embodiments of the presently disclosed subject matter.

DETAILED DESCRIPTION

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

Figure 1A:
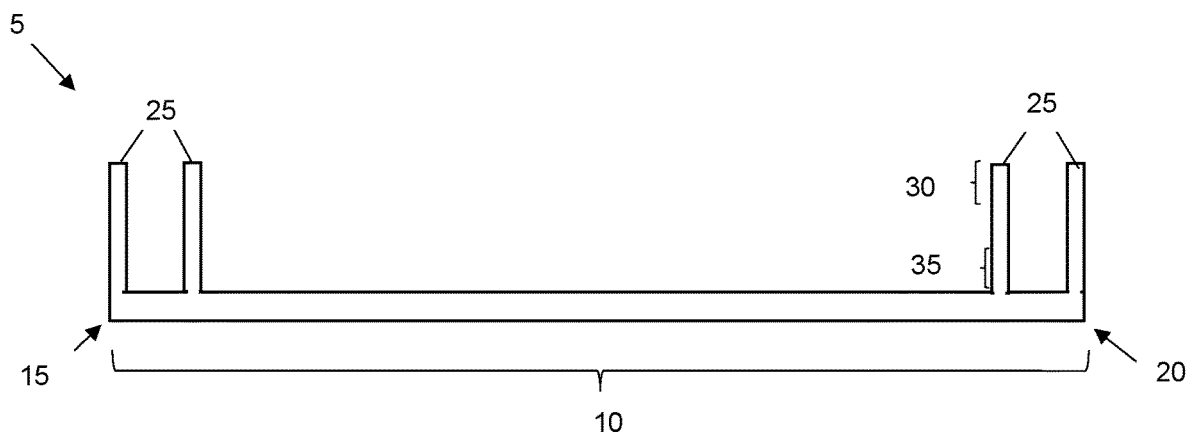
FIG. 1a is a top plan view of a lock device in accordance with some embodiments of the presently disclosed subject matter.
Figure 1B:
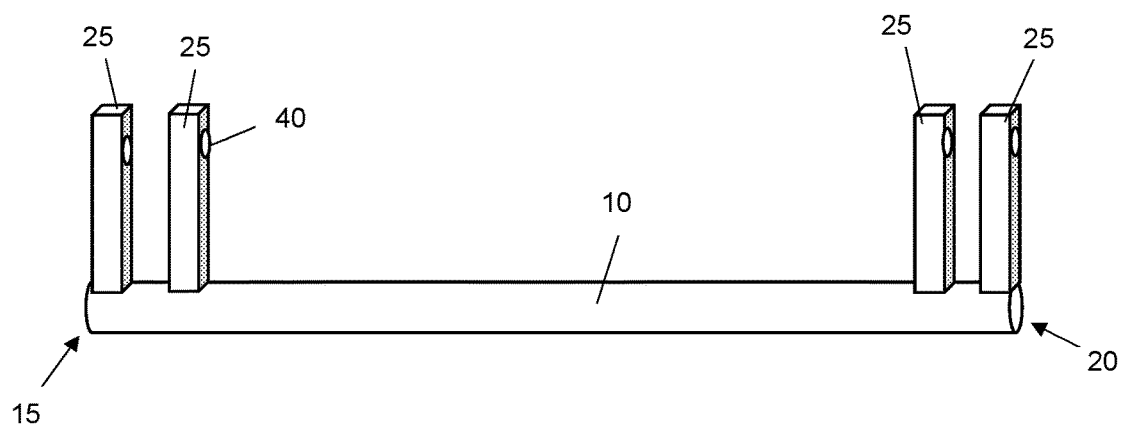
FIG. 1b is a perspective view of a lock device in accordance with some embodiments of the presently disclosed subject matter.

FIGS. 1a and 1b illustrate one embodiment of anti-theft device 5. As shown, the device comprises body 10 comprising first end 15 and second end 20. Each end of the device comprises a pair of arms 25. Each arm includes distal end 30 and proximal end 35. As shown in FIG. 1b, distal end 30 of each arm includes aperture 40. As set forth in more detail herein below, aperture 40 is sized and shaped to allow a lock or other securing agent to pass therethrough. For example, with riding lawn mowers, device 5 can be used to lock the mower handles in an "off" position, so that the mower cannot be started until device 5 is removed.

Figure 1C:
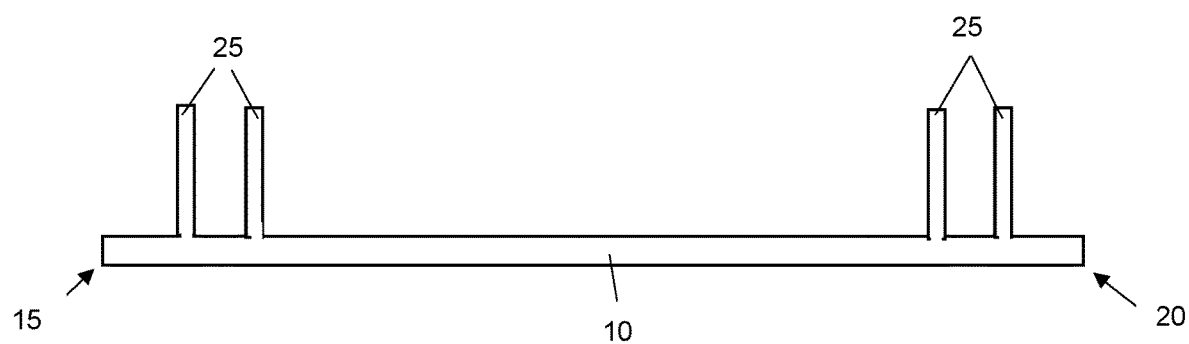
FIG. 1c is a perspective view of a lock device in accordance with some embodiments of the presently disclosed subject matter.

In some embodiments, at least one arm 25 is positioned flush (e.g., level or even) with an end of main body 10 as shown in FIG. 1b. Alternatively, the outer arm of each pair can be positioned at a distance of about 1-15% of the total length of the main body from the first end or the second end, as shown in FIG. 1c. Thus, the outer arm of at least one pair of arms 25 can be positioned at least about (or no more than about) 1, 2, 3, 4, 5, 6, 7, 8, 9, 10, 11, 12, 13, 14, or 15 percent of the total length of main body 10. Therefore, if the total length 11 of main body 10 is 10 inches, arm 25 can be positioned 0.1-1.5 inches from first end 15 or second end 20. However, it should be appreciated that the presently disclosed subject matter is not limited and arms 25 can be positioned at any desired location.

Figure 2A:
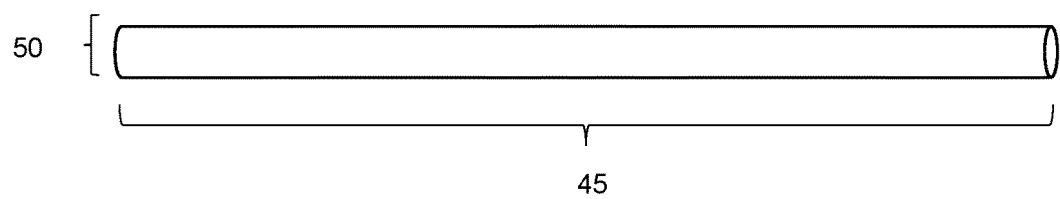
FIG. 2a is a perspective view of a lock device body in accordance with some embodiments of the presently disclosed subject matter.
Figure 2B:
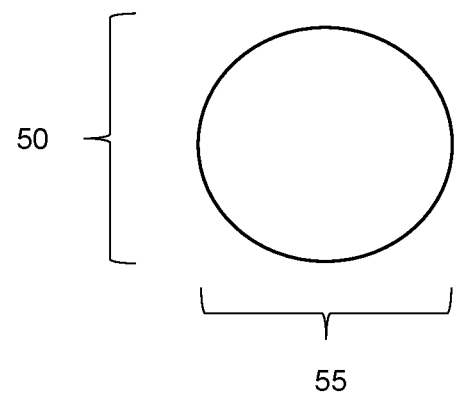
Figure 2C:
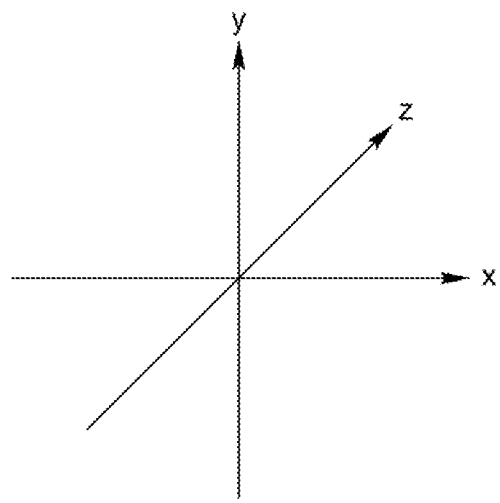
FIG. 2c is an illustration of an x, y, z plane.
Figure 3A:
FIGS. 3a-3g are cross-sectional views of lock device body shapes in accordance with some embodiments of the presently disclosed subject matter.
Figure 3B:
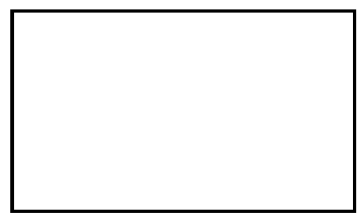
Figure 3C:
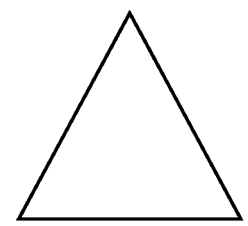
Figure 3D:
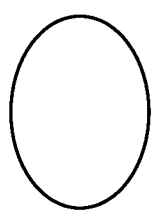
Figure 3E:
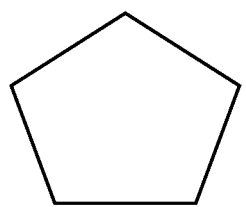
Figure 3F:
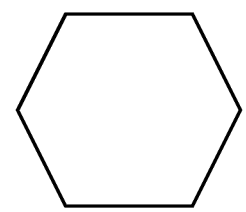
Figure 3G:
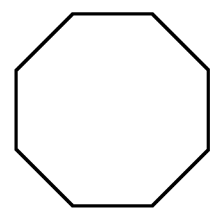

FIGS. 2a and 2b illustrate one embodiment of main body 10. As shown, the body has a defined length 45, height 50, and width 55. The term "length" refers to the dimension in the longitudinal direction of the device, e.g., the distance between first end 15 and second end 20. The term "height" refers to the vertical length from the lowermost portion of the main body to the uppermost portion of the main body and can be perpendicular to the length. The term "width" refers to the distance across the widest portion of the device. In some embodiments, the length refers to the distance substantially long the x-axis, the width refers to the distance substantially along the y-axis, and the thickness refers to the distance substantially along the z-axis, as illustrated in FIG. 2c.

In some embodiments, length 45 can be about 15-40 inches. Thus, the main body can have a length of at least about (or no more than about) 15, 16, 17, 18, 19, 20, 21, 22, 23, 24, 25, 26, 27, 28, 29, 30, 31, 32, 33, 34, 35, 36, 37, 38, 39, or 40 inches. However, the presently disclosed subject matter is not limited and the main body can have a length outside the range set forth above. In some embodiments, length 45 can be adjustable to allow the main body to accommodate a variety of vehicles of different sizes. Any known element can be used to increase or decrease the length of the main body, such as (but not limited to) a telescoping arrangement.

Main body 10 can have a height and/or width of about 0.25-4 inches. Thus, the main body can have a height and/or width of at least about (or no more than about) 0.25, 0.5, 0.75, 1, 1.25, 1.5, 1.75, 2, 2.25, 2.5, 2.75, 3, 3.25, 3.5, 3.75, or 4 inches. However, the presently disclosed subject matter is not limited and the main body can have a height and width outside the range set forth above.

As shown in FIG. 2b, body 10 can have a round cross-sectional shape. However, the presently disclosed subject matter is not limited and body 10 can have a square, rectangular, triangular, oval, pentagonal, hexagonal, or octagonal shape, as set forth in FIGS. 3a-3g. It should be appreciated that the cross-sectional shape of body 10 is not limited to those shapes set forth in the Figures, and any desired shape can be used.

In some embodiments, body 10 can be solid to provide substantial weight and strength to the device. However, the presently disclosed subject matter also includes embodiments wherein the device is hollow.

As set forth above, body 10 further includes arms 25 positioned at first and send ends 15, 20. FIGS. 4a-4c illustrate one embodiment of arm 25. As illustrated, the arms can be configured in a rectangular shape, although any desired shape can be used (e.g., square, rounded, oval, abstract, T-shaped, clover leaf, and the like).

In some embodiments, arms 25 can have a length 41 of about 2-8 inches, such as at least about (or no more than about) 2, 2.25, 2.5, 2.75, 3, 3.25, 3.5, 3.75, 4, 4.25, 4.5, 4.75, 5, 5.25, 5.5, 5.75, 6, 6.25, 6.5, 6.75, 7, 7.25, 7.5, 7.75, or 8 inches. In some embodiments, arms 25 can have width 42 of about 0.1-3 inches, such as at least about (or no more than about) 0.1, 0.2, 0.3, 0.4, 0.5, 0.75, 1, 1.25, 1.5, 1.75, 2, 2.25, 2.5, 2.75, or 3 inches. In some embodiments, arms 25 can have a thickness 43 of about 0.1-3 inches, such as at least about (or no more than about) 0.1, 0.2, 0.3, 0.4, 0.5, 0.6, 0.7, 0.8, 0.9, 1, 1.25, 1.5, 1.75, 2, 2.25, 2.5, 2.75, or 3 inches. However, it should be appreciated that the length, width, and thickness of arm 25 (and body 10) are not limited and can be configured outside the ranges set forth herein.

Each arm 25 includes aperture 40 passing therethrough. The term "aperture" refers to an opening that extends through the thickness of the arm. Although depicted as round in the Figures, apertures 40 can be configured in any desired shape, such as (but not limited to) square, rectangular, triangular, diamond, abstract, hexagonal, heptagonal, octagonal, and the like. In some embodiments, both apertures in a pair of arms have the same size and/or shape. In some embodiments, all of the apertures in the device have the same size and/or shape. The apertures on a pair of arms can be configured to align with each other. In some embodiments, all of the apertures on the device arms align with each other. The term "align" as used herein refers to a positioning or state of adjustment of two or more items in relation to each other. For example, when aligned, an object (e.g., a portion of a lock) is able to pass through both apertures in a pair of device arms.

Aperture 40 can have a diameter of about 0.05-2 inches (e.g., at least about or no more than about 0.05, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, or 2 inches. The term "diameter" as used herein refers to the distance of a straight-line segment passing through the center of the aperture.

The apertures can be formed in arms 25 using any known method, such as (but not limited to) laser cutting, mechanical cutting devices (blades, drills, saws, etc.), water cutting, and the like.

In some embodiments, arms 25 can be permanently attached to body 10 using any known method, such as the use of adhesives, welding, or any other known bonding technique. The presently disclosed subject matter also includes embodiments wherein the arms are releasably attached to body 10, such as through the use of mechanical closures (e.g., snap-fit attachment, clips, rivets, fasteners, screws, pins, bolts, and the like).

Figure 5:
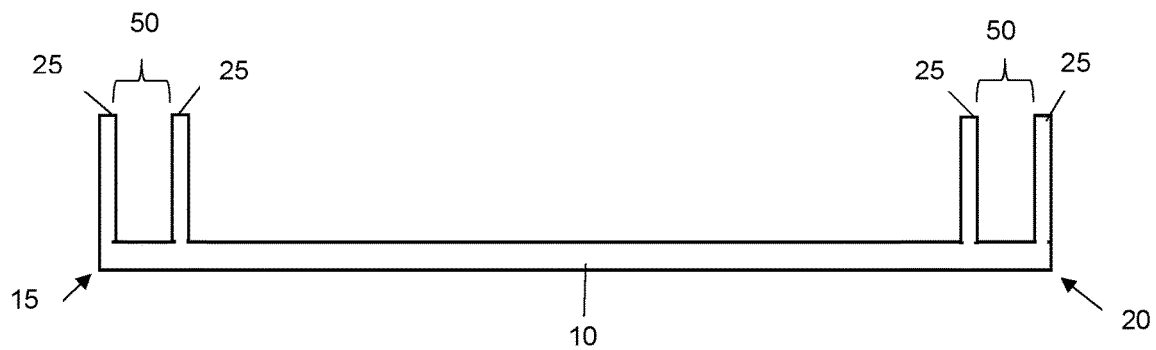
FIG. 5 is a top plan view of a locking device in accordance with some embodiments of the presently disclosed subject matter.

As set forth above, a pair of arms 25 are positioned at or near each end of body 10. The arms are configured such that the handles of a motorized vehicle (e.g., a riding lawn mower) pass between the arms of each pair of arms. Thus, each pair of arms is configured with maximum distance 50 therebetween of about 1-5 inches (e.g., at least about or no more than about 1, 1.25, 1.5, 1.75, 2, 2.25, 2.5, 2.75, 3, 3.25, 3.5, 3.75, 4, 4.25, 4.5, 4.75, or 5 inches), as shown in FIG. 5. However, the presently disclosed subject matter also includes embodiments wherein distance 50 is greater or lesser than the range given herein. In some embodiments, distance 50 between each pair of arms is adjustable to accommodate a wide variety of motorized vehicles. For example, the arms can be attached to body 10 using clips or other fastening elements to allow distance 50 to be adjusted as needed for a particular vehicle (e.g., the distance between each pair of arms can be increased or decreased as desired by the user).

Figure 6A:
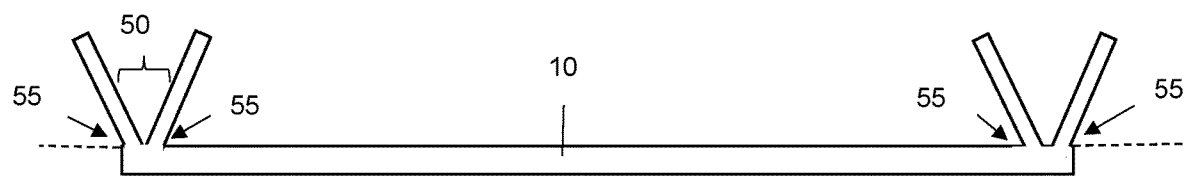
FIG. 6a is a top plan view of a locking device configured with acute arms in accordance with some embodiments of the presently disclosed subject matter.
Figure 6B:
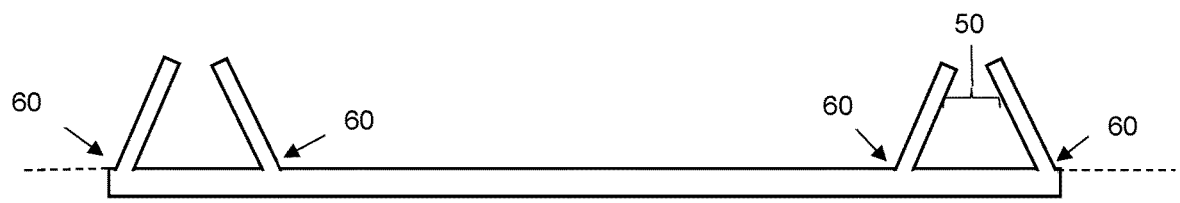
FIG. 6b is a top plan view of a locking device configured with obtuse arms in accordance with some embodiments of the presently disclosed subject matter.

In some embodiments, each arm is parallel in relation to the other arms of the device, as shown in FIG. 5. However, in some embodiments, the arms can be angled as illustrated in FIGS. 6a and 6b. For example, in some embodiments, each arm can be configured at acute angle 55 relative to main body 10, as shown in FIG. 6a. Acute angle 55 can therefore range from about 30 to 85 degrees, such as at least about (or no more than about) 30, 35, 40, 45, 50, 55, 60, 65, 70, 75, 80, or 85 degrees. The handles of a corresponding motorized vehicle fit within interior 50 below aperture 40.

Alternatively, in some embodiments, each arm can be configured at obtuse angle 60 relative to main body 10 as shown in FIG. 6b. Obtuse angle 60 can thus range from about 95-150 degrees, such as at least about (or no more than about) 95, 100, 105, 110, 115, 120, 125, 130, 135, 140, 145, or 150 degrees. The handles of a motorized vehicle fit within interior 50 below aperture 40.

In some embodiments, the arm pairs can be mixed and matched between parallel, acute, and obtuse configurations as desired by the user and/or depending on the particular vehicle the device is to be used with.

Figure 6C:
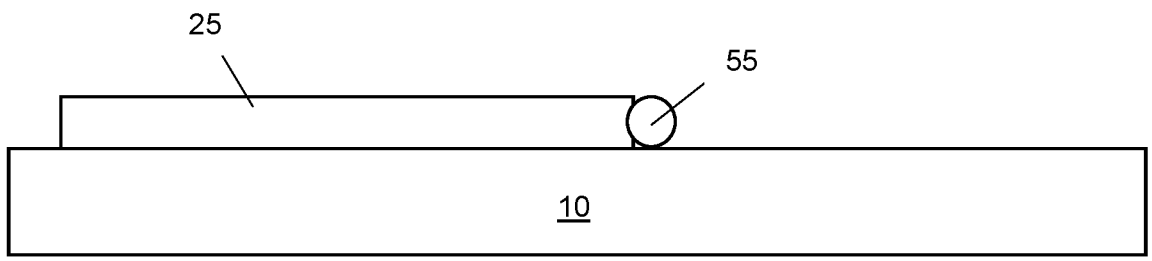
FIGS. 6c and 6d are side plan views of a locking device comprising a moveable arm in accordance with some embodiments of the presently disclosed subject matter.
Figure 6D:
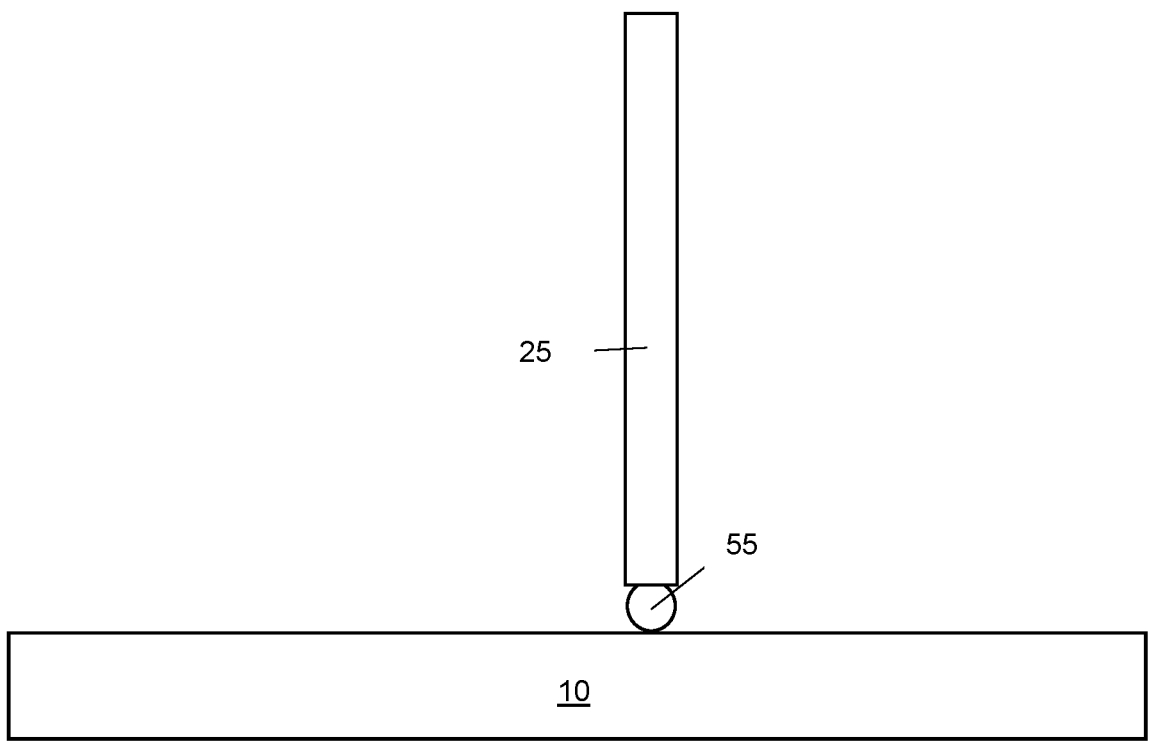

In some embodiments, the arms can be hinged to allow rotational movement, such as to secure the handle of a motorized vehicle within. For example, as shown in FIGS. 6c and 6d, at least one of arms 25 can include rotator 55 to allow movement between the extended position of FIG. 6c and the active position of FIG. 6d. In this way, a user can easily insert a corresponding vehicle handle into interior 50. Any rotational element can be used, such as (but not limited to) hinges, wedges, and the like. In some embodiments, the arm can lock into a desired position using known elements.

Device 5 can be constructed from any known rigid material. The term "rigid material" refers to any material that provides structure or hardness to a device, maintaining its shape or form (e.g., not easily flexible, bendable, or malleable). Thus, the disclosed device can be constructed from one or more polymeric materials (e.g., high density polyethylene, polypropylene, etc.), wood, and/or metals (stainless steel, steel, aluminum, platinum, copper, etc.). In some embodiments, combinations of the cited materials can be used.

The disclosed device can have any desired weight, such as (but not limited to) about 3-15 pounds (e.g., at least about or no more than about 3, 4, 5, 6, 7, 8, 9, 10, 11, 12, 13, 14, or 15 pounds). However, it should be appreciated that device 5 can be constructed to have a weight that is outside the range set forth above.

Device 5 can be constructed using any known method, such as extrusion, injection molding, compression molding, welding, and the like.

Figure 7:
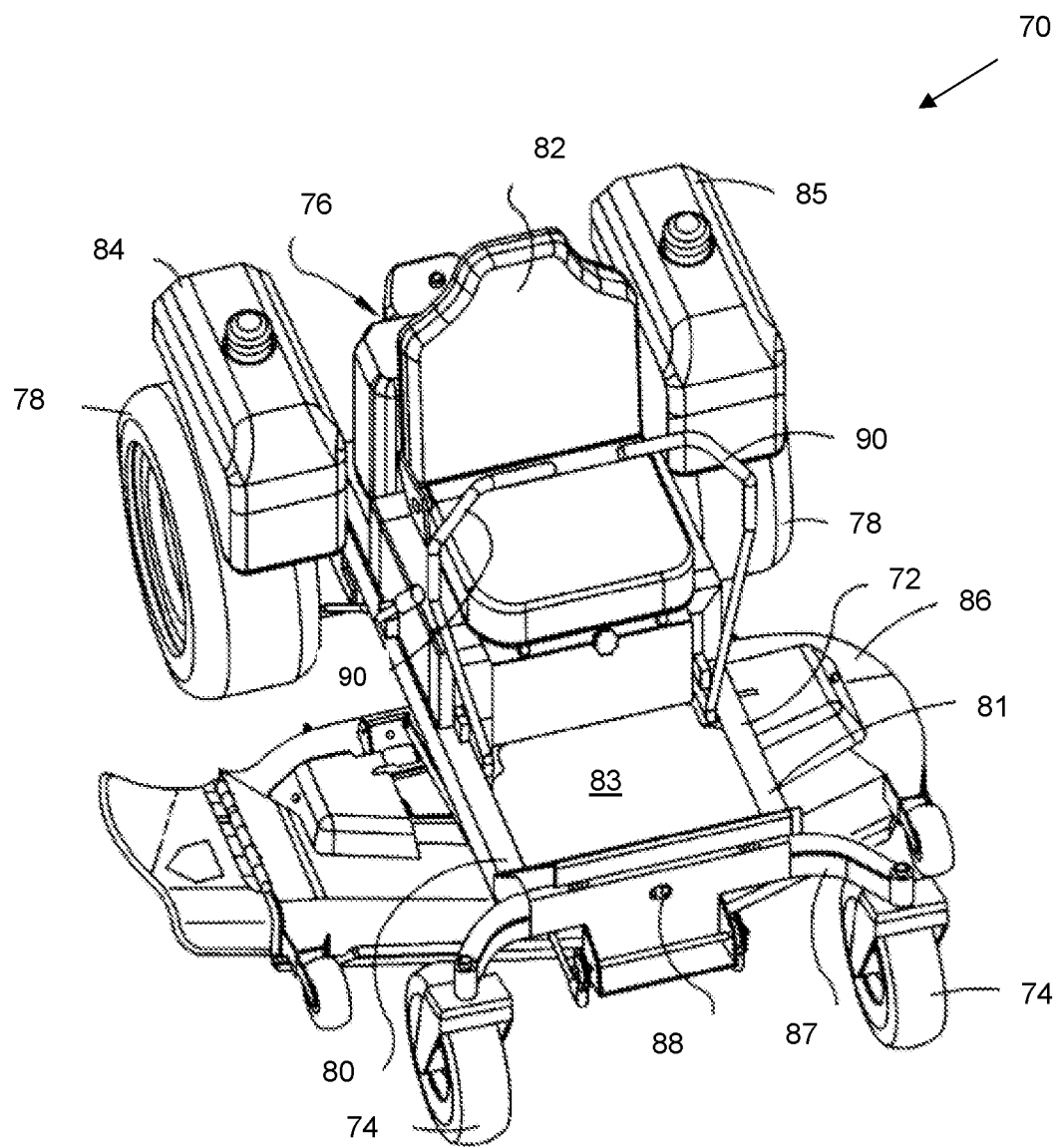
FIG. 7 is a perspective view of a conventional lawn mower in accordance with some embodiments of the presently disclosed subject matter.

In use, the disclosed device can be releasably attached to a motorized vehicle, such as a riding lawn mower. The term "releasably attached" refers to any manner of attaching two items together that are not intended to be permanently attached but can be removed and attached multiple times. FIG. 7 illustrates one embodiment of a conventional riding lawn mower. As shown, riding mower 70 includes frame 72 and engine 76 that is operatively attached to the frame. The frame can include first and second frame members 80, 81 running from the front to the back of the riding mower. The frame can also include articulating front frame member 87 that is pivotable about an articulating pin 88. The engine can be of any type currently used in the art that provides locomotion to the riding mower. Front wheels 74 and rear wheels 78 are operatively attached to frame 72. The wheels are controlled by first and second control handles 90. Riding mower 70 can also include operator seat 82 and floorboard 83 operatively attached to the frame. As shown, the mower can also include first and second fuel tanks 84, 85 that can hold gasoline, diesel fuel, propane, or another fuel. The riding mower also includes mower deck 86 that is used to cut associated vegetation (not shown) in a manner well known in the art. In some embodiments, the disclosed mower is a zero-turn mower (e.g., the riding mower has zero radius turning capabilities). To turn the mower on for use (e.g., to activate the engine), handles 90 must be rotated outward from the locked position illustrated in FIG. 7. In other words, as long as the handles are in the locked position, the mower will not start.

Figure 8A:
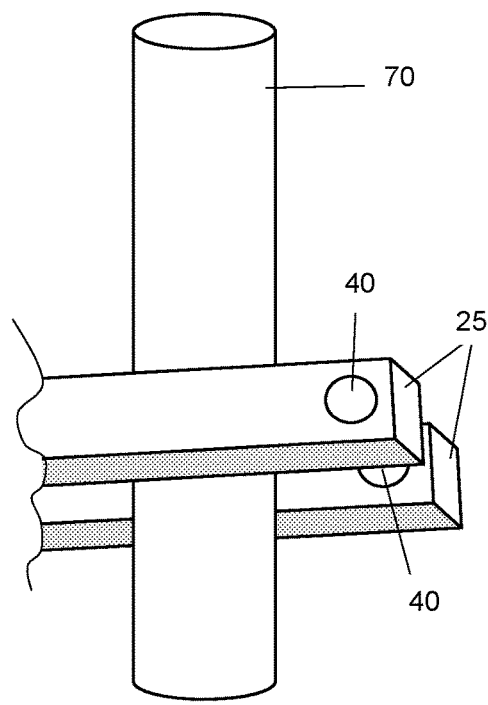
FIG. 8a is a perspective view of a lawn mower handle interaction with a locking device arm in accordance with some embodiments of the presently disclosed subject matter.
Figure 8B:
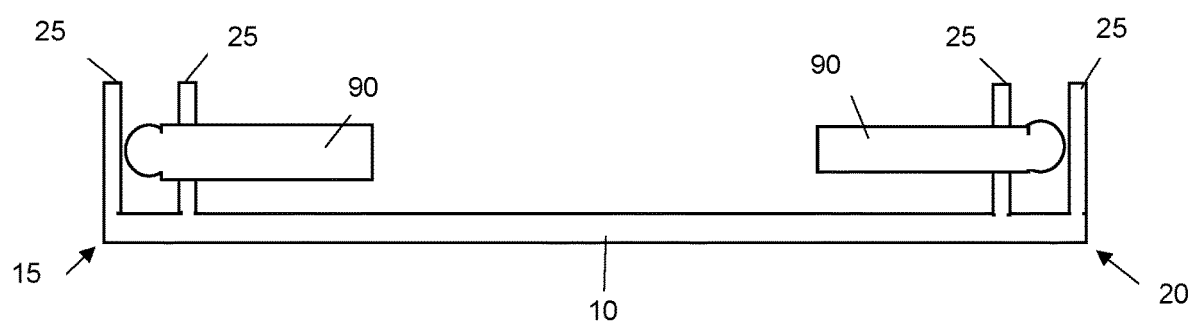
FIG. 8b is a top plan view of a lawn mower handle interaction with a locking device arm in accordance with some embodiments of the presently disclosed subject matter.

A user can safeguard the mower and prevent (or at least deter) theft through use of the disclosed device. Particularly, device 5 retains mower handles 90 in the locked, upright position. As illustrated in FIG. 8*a*, device 5 can be easily assembled on mower 70 by first positioning at least a portion of each mower handle within distance 50 between a pair of device arms 25. In some embodiments, the device is about perpendicularly installed on a corresponding pair of mower handles to allow the handle to fit between each pair of arms. Each mower arm is positioned between a pair of device arms, as shown in FIG. 8*b*. The apertures on each pair of device arms are then aligned such that a securing element can be inserted therethrough (e.g., zip ties, plastic bands, key locks, combination locks, padlocks, digital locks, cable locks, and the like).

Figure 8C:
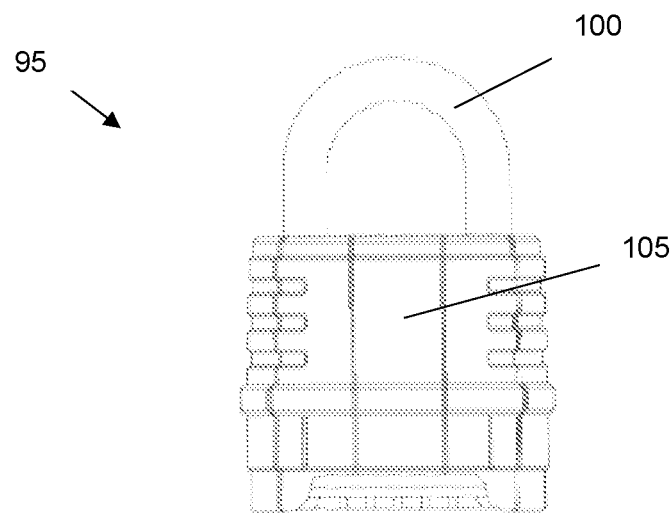
FIG. 8c is a front plan view of a conventional lock in accordance with some embodiments of the presently disclosed subject matter.
Figure 8D:
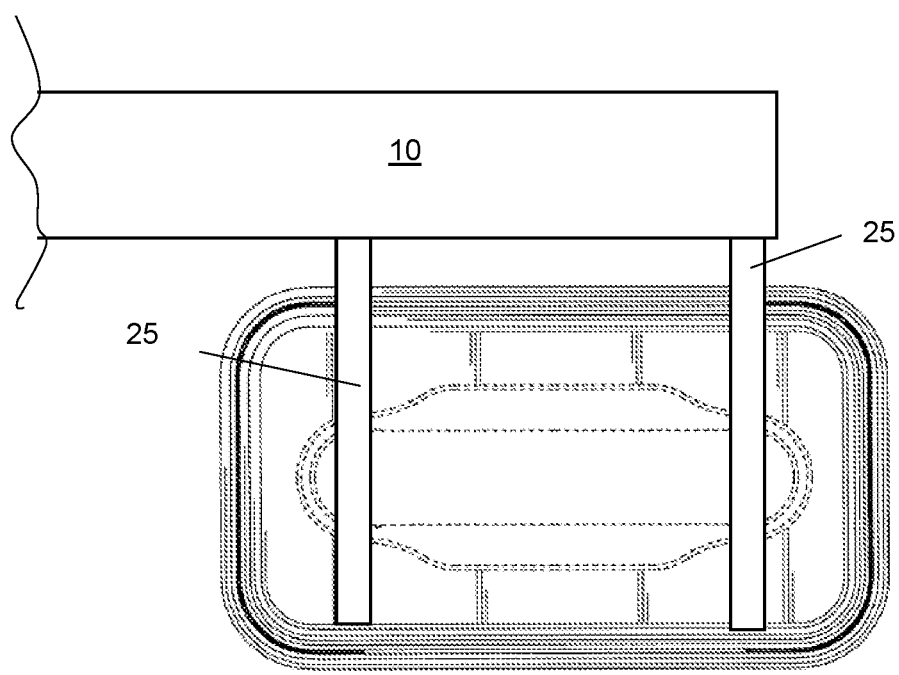
FIG. 8d is a fragmentary top plan view illustrating a lock interaction with device arms in accordance with some embodiments of the presently disclosed subject matter.

FIG. 8*c* illustrates one representative example of a securing element configured as lock 95. The lock includes hasp 100 that releasably attaches with case 105. In the embodiment shown, the hasp is curved and can pass through a pair of apertures 40. The case houses the internal mechanisms of the lock (e.g., tumblers). Once a combination is entered or a key is used, hasp 100 is partially or completely released from case 105. It should be appreciated that the presently disclosed subject matter is not limited to a lock according to FIG. 8*c*, and any element that can pass through apertures 40 to secure device 5 to the mower can be used. In some embodiments, the securing element can pass through all four arms instead of a single pair.

Thus, in use, the unlocked hasp is inserted through apertures 40 of a pair of device arms 25. Once inserted through, the hasp is then releasably secured to case 105 for a desired amount of time (e.g., overnight or during storage of the vehicle). While the device is secured (via lock 95) to the device, the mower handles are locked in an upright ("off") position. To start the mower, the handles must be moved in a downward direction, closer to the frame of the vehicle. Only when the handles are moved can the mower engine be started. Thus, the disclosed device retains the mower handles in an upright position (e.g., handles 90 are set in an upright position). When a user desires to use the mower, he simply removes the securing element from the device. For example, a key can be used to release hasp 100 from case 105, allowing the hasp to be removed from the device apertures. After the securing element has been removed, the device can be removed from the mower. The handles are then free to rotate into the "on" position to allow the mower to be started and used.

The disclosed device therefore provides an effective way to deter or prevent theft of riding lawn mower, or any other vehicle with handles that must be moved to effectuate engine initiation.

Device 5 is easy and quick to install and remove, saving the user time during installation and removal. Accordingly, the device can easily be used on a daily basis.

The disclosed device is also constructed from resilient materials that resist damage during attempted theft or when inadvertently dropped.

These and other advantages would be apparent to those of ordinary skill in the art after a review of the presently disclosed subject matter.

What is claimed is:

1. A device comprising:
a planar main body defined by a first end and a second end;
a first pair of arms positioned at the first end and a second pair of arms positioned at the second end;
wherein each pair of arms comprises a first arm and a second arm that are separated by a predetermined distance;
wherein each first arm is defined by an aperture that is aligned with the corresponding aperture on the second arm of each pair;
wherein the arms extend from one face of the main body; and
wherein the distance between the first arm is adjustable relative to the second arm in each pair of arms.

2. The device of claim 1, wherein at least one arm of the first pair of arms or second pair of arms is flush with the first end or second end of the main body.

3. The device of claim 1, wherein at least one arm of the first pair of arms or second pair of arms is positioned at a distance of 5-15% of a total length of the main body from the first end or the second end.

4. The device of claim 1, wherein the planar main body has an adjustable total length.

5. The device of claim 1, wherein the apertures on the first pair of arms align with the apertures on the second pair of arms.

6. The device of claim 1, wherein at least one of the first pair of arms or second pair of arms is removable from the main body.

7. The device of claim 1, wherein the predetermined distance between the first and second pairs of arms is adjustable.

8. The device of claim 1, wherein the first pair of arms is parallel to the second pair of arms.

9. The device of claim 1, wherein the first pair of arms, second pair of arms, or both are configured at an acute angle relative to the main body.

10. The device of claim 1, wherein the first pair of arms, second pair of arms, or both are configured at an obtuse angle relative to the main body.

11. The device of claim 1, wherein the first pair of arms, second pair of arms, or both are rotatable relative to the main body.

12. A method of securing the handles of a riding lawn mower comprising first and second handles, the method comprising:
- inserting the first handle of a riding lawn mower into the distance between the first pair of arms of the locking device of claim 1;
- inserting the second handle of the riding lawn mower into the distance between the second pair of arms of the locking device of claim 1;
- positioning a first securing element through the apertures of the first pair of arms;
- positioning a second securing element through the apertures of the second pair of arms;
- releasably fastening the securing elements such that they cannot be removed from the apertures of the first and second pair of arms;
- wherein the handles of the riding lawn mower are secured for a desired amount of time.

13. The method of claim 12, wherein the lawn mower is a zero-turn lawn mower.

14. The method of claim 12, wherein the securing element is selected from a zip tie, combination lock, key lock, padlock, digital lock, cable lock, or combinations thereof.

15. The method of claim 12, wherein the planar main body has an adjustable total length.

16. The method of claim 12, wherein the first pair of arms, second pair of arms, or both are configured at an acute angle relative to the main body.

17. The method of claim 12, wherein the first pair of arms, second pair of arms, or both are configured at an obtuse angle relative to the main body.

18. The method of claim 12, wherein the first pair of arms, second pair of arms, or both comprises can rotate relative to the main body.

19. A method of securing the handles of a riding lawn mower comprising first and second handles, the method comprising:
- inserting the first handle of a riding lawn mower into the distance between the first pair of arms of the locking device of claim 1;
- inserting the second handle of the riding lawn mower into the distance between the second pair of arms of the locking device of claim 1;
- positioning a securing element through the apertures of the first pair of arms and through the apertures of the second pair of arms;
- releasably fastening the securing element such that it cannot be removed from the apertures of the first and second pair of arms;
- wherein the handles of the riding lawn mower are secured for a desired amount of time.

20. The method of claim 19, wherein the lawn mower is a zero-turn lawn mower.

* * * * *